United States Patent
Crawford

(10) Patent No.: US 6,936,212 B1
(45) Date of Patent: Aug. 30, 2005

(54) SELECTIVE DEPOSITION MODELING BUILD STYLE PROVIDING ENHANCED DIMENSIONAL ACCURACY

(75) Inventor: Clark W. Crawford, Los Angeles, CA (US)

(73) Assignee: 3D Systems, Inc., Valencia, CA (US)

( * ) Notice: Subject to any disclaimer, the term of this patent is extended or adjusted under 35 U.S.C. 154(b) by 107 days.

(21) Appl. No.: 10/068,917

(22) Filed: Feb. 7, 2002

(51) Int. Cl.⁷ .......................... B28B 1/14; B29C 41/08
(52) U.S. Cl. ........................ 264/308; 264/401
(58) Field of Search ................. 264/401, 308, 264/496, 227, 317, 497; 700/119, 120; 425/375, 449

(56) References Cited

U.S. PATENT DOCUMENTS

| | | | |
|---|---|---|---|
| 4,575,330 A | * | 3/1986 | Hull ........................ 156/58 |
| 4,844,144 A | | 7/1989 | Murphy et al. |
| 5,031,120 A | | 7/1991 | Pomerantz et al. |
| 5,176,188 A | | 1/1993 | Quinn et al. |
| 5,204,055 A | | 4/1993 | Sachs et al. |
| 5,216,616 A | | 6/1993 | Masters |
| 5,256,340 A | | 10/1993 | Allison et al. |
| 5,364,889 A | | 11/1994 | Quinn et al. |
| 5,387,380 A | | 2/1995 | Cima et al. |
| 5,555,176 A | | 9/1996 | Menhennett et al. |
| 5,616,293 A | * | 4/1997 | Ashtiani-Zarandi et al. 264/401 |
| 5,728,345 A | * | 3/1998 | Hlavaty et al. ............ 264/401 |
| 5,866,058 A | | 2/1999 | Batchelder et al. |
| 6,007,318 A | | 12/1999 | Russell et al. |
| 6,110,602 A | | 8/2000 | Dickens et al. |
| 6,132,665 A | | 10/2000 | Bui et al. |
| 6,193,923 B1 | | 2/2001 | Leyden et al. |
| 6,238,613 B1 | | 5/2001 | Batchelder et al. |
| 6,261,506 B1 | | 7/2001 | Nguyen et al. |
| 6,270,335 B2 | | 8/2001 | Leyden et al. |
| 6,305,769 B1 | | 10/2001 | Thayer et al. |
| 6,309,581 B1 | | 10/2001 | Gervasi |

OTHER PUBLICATIONS

U.S. Appl. No. 09/970,956, filed Oct. 3, 2001, by Varnon et al.
U.S. Appl. No. 09/971,247, filed Oct. 3, 2001, by Schmidt et al.

* cited by examiner

*Primary Examiner*—Donald J. Loney
(74) *Attorney, Agent, or Firm*—James E. Curry; Ralph D'Alessandro

(57) ABSTRACT

A method of forming a three-dimensional object in a layerwise manner is disclosed. The object is formed in a manner that substantially prevents non-uniform distortion to occur during the layerwise build process as the build material forming the object solidifies and shrinks. The formed object comprises an outer surface defined by a shell structure and an internal lattice structure residing within the internal volume of the object. The object may be formed by any selective deposition modeling apparatus from a wide variety of materials.

28 Claims, 6 Drawing Sheets

SELECTIVE DEPOSITION MODELING BUILD STYLE PROVIDING ENHANCED DIMENSIONAL ACCURACY

BACKGROUND OF THE INVENTION

1. Field of the Invention.

The invention relates in general to selective deposition modeling, and in particular to a method of dispensing a build material to form a three-dimensional object having enhanced dimensional accuracy. The enhanced dimensional accuracy of the three-dimensional objects formed make them useful as sacrificial patterns in investment casting processes or as dimensionally improved rapid prototypes.

2. Description of the Prior Art.

Recently, several new technologies have been developed for the rapid creation of models, prototypes, and parts for limited run manufacturing. These new technologies are generally called Solid Freeform Fabrication techniques, and are herein referred to as "SFF." Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a building material to fabricate the part in successive layers. SFF technologies have many advantages over conventional manufacturing methods. For instance, SFF technologies dramatically shorten the time to develop prototype parts and can produce limited numbers of parts in rapid manufacturing processes. They also eliminate the need for complex tooling and machining associated with conventional subtractive manufacturing methods, including the need to create molds for custom applications. In addition, customized objects can be directly produced from computer graphic data in SFF techniques.

Generally, in most SFF techniques, structures are formed in a layer by layer manner by solidifying or curing successive layers of a build material. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM," a phase change build material is jetted or dropped in discrete droplets, or extruded through a nozzle, to solidify on contact with a build platform or previous layer of solidified material in order to build up a three-dimensional object in a layerwise fashion. Other synonymous names for SDM used in this new industry are solid object imaging, deposition modeling, multi-jet modeling, three-dimensional printing, thermal stereolithography, and the like. Often, a thermoplastic material having a low-melting point is used as the solid modeling material, which is delivered through a jetting system such as an extruder or print head. One type of SDM process which extrudes a thermoplastic material is described in, for example, U.S. Pat. No. 5,866,058 to Batchelder et al. One type of SDM process utilizing a printer to selectively dispense a liquid binder on a layer of powder is described in, for example, U.S. Pat. No. 6,007,318 to Russell, et. al. One type of SDM process utilizing ink jet print heads is described in, for example, U.S. Pat. No. 5,555,176 to Menhenneft et al. Some thermoplastic build materials used in SDM are available and sold under the names ThermoJet® 2000 and ThermoJet® 88 by 3D Systems, Inc. of Valencia, Calif. Also, some formulations for thermoplastic phase change build materials are disclosed in U.S. Pat. No. 6,132,665 to Bui et al. which is herein incorporated by reference as set forth in full.

SDM systems have certain advantages over other SFF systems such as stereolithography. One significant advantage of SDM systems is that they are significantly less expensive than stereolithography systems. This is generally due to the use of relatively low cost dispensing devices employed in SDM systems such as ink jet print heads, instead of the expensive lasers and scanning components used in stereolithography systems.

However, SDM systems have some disadvantages. Because most materials used in SDM inherently shrink as they solidify, the solid three-dimensional objects are subjected to non-linear distortion. Undesirably, this non-linear distortion can cause, for example, flat planar surfaces to bow or distort as the object cools down to ambient temperatures. In contrast to linear shrinkage, with occurs in all three dimensions and can be compensated for with shrink compensation factors, this non-linear distortion generally cannot be compensated for since it is dependent on the geometry of the object and the inherently non-uniform cooling rate of the object. Thus, solid objects formed by SDM are not well suited in applications where high dimensional accuracy is needed; for example, such as in investment casting where the object is utilized as the sacrificial pattern for forming the final cast part.

Previous expedients in stereolithography have developed build styles which produce hollow structures exhibiting high dimensional accuracy for use in investment casting. An example of one such technique is the Quickcast™ build style used by 3D Systems, Inc., which produces three-dimensional objects from a cured photopolymer resin. These three-dimensional objects have a skin and a honeycomb-like internal structure as disclosed in U.S. Pat. No. 6,110,602 to Dickens et al. Importantly, the honeycomb-like internal structure comprises a plurality of spaced-apart plates connected together at their corners or edges so that the structure will buckle or give during the investment casting process. This is necessary so that the object will not expand and crack the ceramic slurry when the slurry is cured. Often temperatures of around 1300° F. are needed to cure the slurry and to burn out the cured photopolymer material which causes thermal expansion in the object that is compensated for by the buckling honeycomb-like build style. When working with phase change materials in SDM, providing a staggered honeycomb-like structure to provide give for thermal expansion in the object is not necessary since temperatures of around only 200° F. are needed to melt and remove the material in the investment casting process. In addition, in the QuickCast build style all the hollow cavities are interconnected to allow for drainage of un-solidified liquid photopolymer after the object is formed. However, this interconnected structure is not necessary when working with non-curable phase change materials in SDM since there is no un-solidified liquid present after the object is formed. Thus, this build style is generally not suitable for use in SDM applications utilizing a single phase change material.

Another expedient in stereolithography build styles which produce hollow structures for use in investment casting is disclosed in U.S. Pat. No. 6,309,581 to Gervasi. In this build style an internal lattice structure of the cured photopolymer material comprises a plurality of tetrahedron structures, each tetrahedron having four legs extending in different directions from a single point. This structure also provides the necessary give in the object so that during the investment casting process the structure will not crack the ceramic slurry. However, forming the tetrahedron structure by SDM is not possible unless a support structure is formed to support the three non-vertically oriented legs of each tetrahedron which also adds unnecessary complexity to the build process. Thus, this build style is also generally not suitable for use in SDM.

Thus, there is a need to develop a method for forming three-dimensional objects by SDM with enhanced dimensional accuracy. These and other difficulties of the prior art have been overcome according to the present invention.

BRIEF SUMMARY OF THE INVENTION

The present invention provides its benefits across a broad spectrum. While the description which follows hereinafter is meant to be representative of a number of such applications, it is not exhaustive. As will be understood, the basic methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

The method of the present invention comprises forming a three-dimensional object in a layerwise manner from a material dispensed to form a shell structure of a desired dimensional configuration. The object has an internal lattice structure to maintain the geometric tolerances of the desired dimensional configuration of the object during the layerwise forming process. The internal lattice structure is formed by dispensing the material along a plurality of continuous segments in each layer formed that attach across the shell structure to maintain the desired dimensional configuration of the shell structure as it is formed. In the first embodiment, a phase change build material is exclusively dispensed to form the three-dimensional object.

The method comprises the steps of providing computer data representing the desired dimensional configuration of the three-dimensional object, and then processing the computer data to establish layer data. The method then comprises dispensing the build material in a flowable state according to the layer data to form layers of the object. The layers of the object comprise the shell structure, and the internal lattice structure formed in the areas of the layers that reside within the internal volume of the object. The internal lattice structure is formed by dispensing the build material along a plurality of continuous segments that attach across the shell structure of the layer being formed. The internal lattice structure maintains the desired dimensional configuration of the shell structure as it is formed. In one embodiment the temperature of the dispensed material is then lowered causing the material to solidify to a non-flowable state, whereby the internal lattice structure functions to substantially prevent the shell structure from non-uniformly deforming as the build material solidifies and shrinks. The continuous segments dispensed in each layer are dispensed over continuous segments of previous layers so as to form vertically extending supports within the shell structure.

Another embodiment of the present invention is a method of forming a three-dimensional object having a shell structure of a desired dimensional configuration surrounding an internal lattice structure. The object is formed in a layerwise manner by dispensing a curable build material and by dispensing a solidifiable support material. The build material is curable upon exposure to radiation and is dispensed to form the shell structure and to form the internal lattice structure of the object. The support material is dispensed to support downward facing surfaces of the shell structure and to support upward facing surfaces of the shell structure within the object.

The objects formed according to the present invention exhibit enhanced dimensional accuracy compared to solid objects formed by SDM and are well suited for use as sacrificial patterns in investment casting. The objects are also more cost effective to produce than solid objects formed by SDM as less build material is dispensed, making the objects well suited as dimensionally accurate rapid prototypes.

BRIEF DESCRIPTION OF THE DRAWINGS

The benefits of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the figures.

DETAILED DESCRIPTION OF THE PREFERRED EMBODIMENTS

Figure 1:
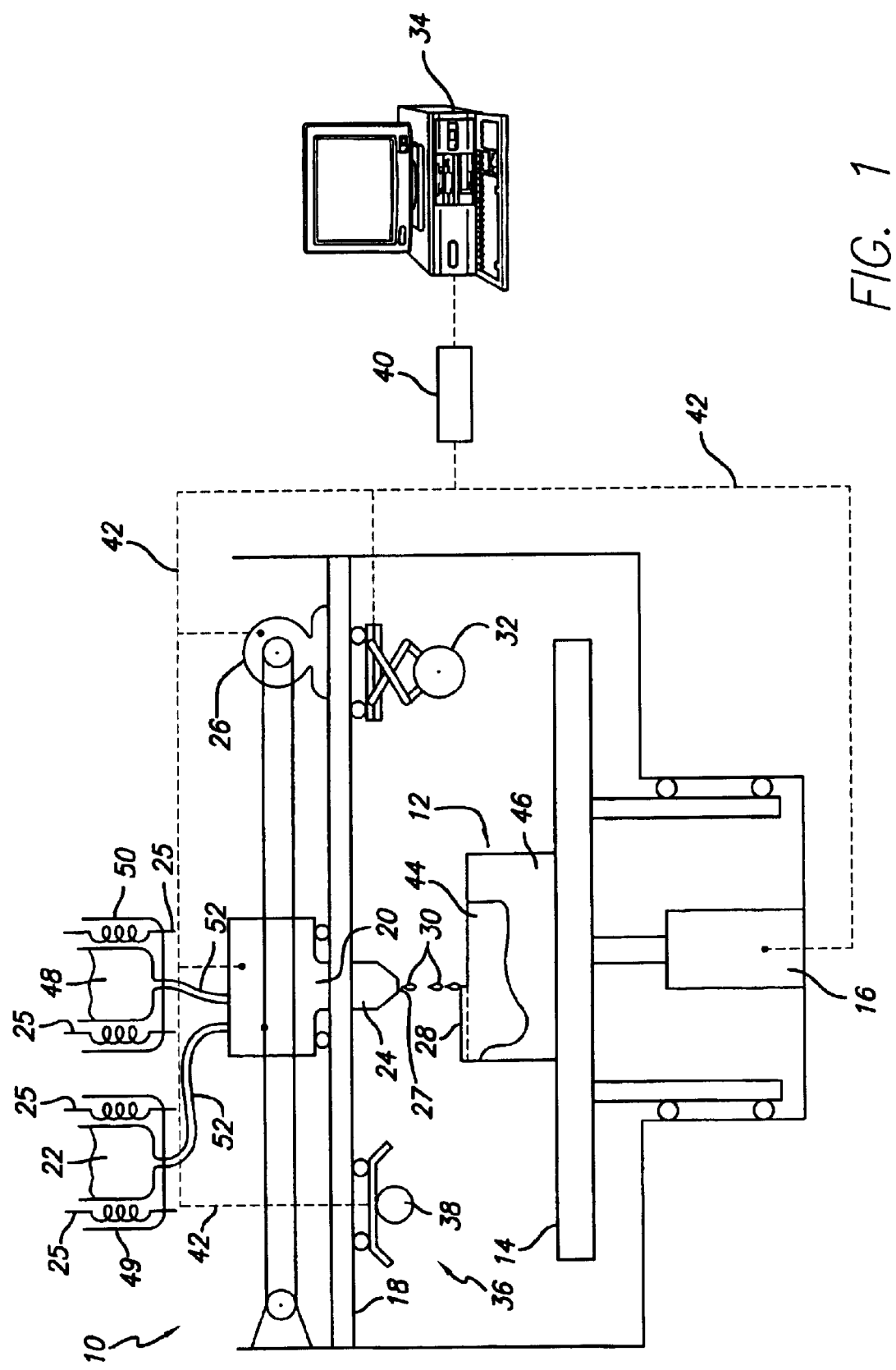
FIG. 1 is a diagrammatic side view of an apparatus for practicing the present invention.

While the present invention is applicable to all SDM techniques, the invention will be described with respect to an SDM technique utilizing an ink jet print head dispensing phase change materials. However, it is to be appreciated that the present invention can be implemented with any SDM technique utilizing a wide variety of materials. For example, SDM techniques that extrude a thermoplastic build material may be used to practice the present invention. In addition, SDM techniques that dispense a photopolymer material, such as the DI 7090 Clear Coat material manufactured by Marabuwerke GmbH & Co., of Tamm, Germany, may also be used.

As used herein, the term "a flowable state" of a build material is a state wherein the material is unable to resist shear stresses that are induced by a dispensing device, such as those induced by an ink jet print head when dispensing the material, causing the material to move or flow. Preferably the flowable state of the build material is a liquid state, however, the flowable state of the build material may also exhibit thixotropic-like properties. The term "solidified" and "solidifiable" as used herein refer to the characteristics of a material where the material transitions from the flowable state to a non-flowable state. A wax-based phase change material, a photocurable material, a thermosetting material, and a powder and binder reacted material, are examples of solidifiable materials. A "non-flowable state" of a build material is a state wherein the material is sufficiently self-supportive under its own weight so as to hold its own shape. A build material existing in a solid state, a gel state, a paste state, a powder state, or a thixotropic state, are examples of a non-flowable state of a build material for the purposes herein. In addition, the term "cured," "curable," or "curing" refers to any polymerization reaction such as photo-polymerization induced by actinic radiation or thermal-polymerization induced by thermal radiation. Preferably the polymerization reaction involves the cross-linking of monomers and oligomers initiated by exposure to actinic radiation in the ultraviolet or infrared wavelength band. The term "cured," "curable," or curing" also refers to a material such as a powder that has been solidified by application of a liquid binder that reacts with the powder to form a solid. Further, the term "cured state" refers to a material, or portion of a material, in which the polymerization reaction has substantially completed, or in which the reaction with a binder has substantially completed. It is to be appreciated as a general matter that many solidifiable materials, such as wax-like phase change materials, can transition back and forth between a flowable and a non-flowable state; however, cured materials such as photopolymers, generally cannot transition back to a flowable state after being cured.

The wax-like phase change materials used in SDM, such as those disclosed in U.S. Pat. No. 6,132,665 to Bui et al., show great promise as materials for forming sacrificial objects for the investment casting process. This is because they can be melted out of a ceramic slurry shell without imparting large thermal expansion forces on the ceramic shell that can crack the shell, as can occur when using solid cured objects formed by stereolithography. However, in processes such as investment casting, a high degree of dimensional accuracy in the sacrificial object is very desirable, yet the resulting dimensional accuracy of solid objects formed by SDM techniques with phase change materials suffer as a result of non-uniform deformation or distortion. This non-uniform deformation occurs as the object cools in a non-uniform manner to ambient temperatures. Thus, solid objects formed from phase change materials by SDM are unable to yield the high degree of dimensional accuracy often required in most investment casting operations.

In producing objects by SDM, there are two sources of distortion which reduce the degree of dimensional accuracy in the resultant object. The first source is linear shrinkage, which occurs as the phase change material solidifies and shrinks. This type of shrinkage is generally predictable and can be compensated for with shrink compensation factors to effectively enlarge the desired dimensional configuration of an object prior to being formed. The second source is non-linear shrinkage, which occurs in the object as it is formed as a result of non-uniform cooling. Non-linear shrinkage, which is related to the thermal mass and the geometry of the object being formed, typically cannot be compensated for when forming solid objects by SDM. For example, when forming a 2-inch solid cube with the ThermoJet® 2000 phase change build material on a ThermoJet® printer available from 3D Systems, Inc. of Valencia, Calif., the top face of the cube deforms inwardly toward the center of the cube as it solidifies and cools to room temperature. The amount of inward distortion in the top face of the cube is substantial and, for the 2-inch cube formed as discussed above, has been measured to be approximately about 0.040 inches. This amount of distortion in sacrificial objects for most investment casting processes is unacceptable.

It is believed that the problem of non-linear shrinkage that occurs when forming objects by SDM can be overcome by substantially reducing the amount of material dispensed to form the object. By substantially reducing the amount of material dispensed to form the object, the resultant thermal mass of the object would be reduced, and thereby reduce the non-linear distortion caused by non-uniform cooling of the object. Ideally, forming an object by SDM having a thin wall shell structure that is completely hollow would minimize non-linear shrinkage due to non-uniform cooling resulting from a high thermal mass. The advantage of hollowing the part results in less heat input during the build process which in turn keeps the part cooler during the build process and reduces distortion as the part returns to ambient temperature. However, it is not possible to form completely hollow objects by SDM without providing support for the shell structure as it is formed. Even so, a hollow object formed by SDM would be subject to a significant amount of curl distortion or bowing that occurs when forming thin wall structures by SDM. Thus, an internal structure is needed to not only support the shell structure, but also to maintain the desired dimensional configuration of the object as it is formed.

One embodiment of the present invention is a method of forming a three-dimensional object in a layerwise manner from a phase change material dispensed to form a shell structure of a desired dimensional configuration. The object has an internal lattice structure formed by dispensing the phase change material along a plurality of continuous segments in each layer being formed. The continuous segments attach across the shell structure to maintain the desired dimensional configuration of the shell structure as it is formed. A suitable SDM apparatus for performing this method of this embodiment is disclosed in U.S. Pat. No. 6,305,769 to Thayer et al. and a suitable phase change material for dispensing from this apparatus is disclosed in U.S. Pat. No. 6,132,665 to Bui et al., both of which are herein incorporated by reference as set forth in full. The method comprises the steps of providing computer data representing the desired dimensional configuration of the three-dimensional object, and then processing the computer data to establish layer data. Next, the method comprises dispensing the build material in a flowable state according to the layer data to form layers of the object comprising the shell structure, and also dispensing the build material in a flowable state according to the layer data to form the layers of the object comprising an internal lattice structure. The internal lattice structure is formed by dispensing the build material along a plurality of continuous segments that attach across the shell structure of the layer being formed. The continuous segments maintain the desired dimensional configuration of the shell structure as it is formed. The next step is to lower the temperature of the dispensed phase change material causing the material to solidify to a non-flowable state, whereby the internal lattice structure functions to substantially prevent the shell structure from non-uniformly deforming as the build material solidifies and shrinks.

Figure 4:
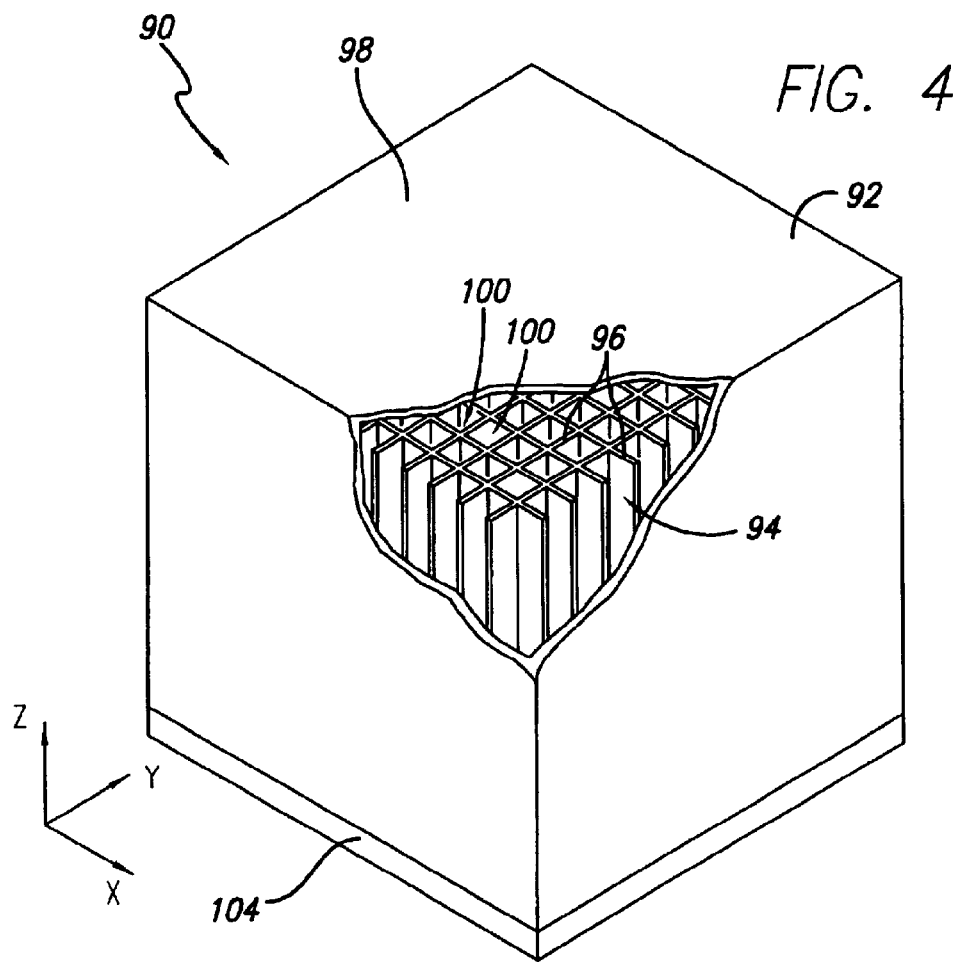
FIG. 4 is an isometric view of a three-dimensional object formed according to the present invention that is shown partially sectioned to reveal the internal lattice structure.
Figure 5:
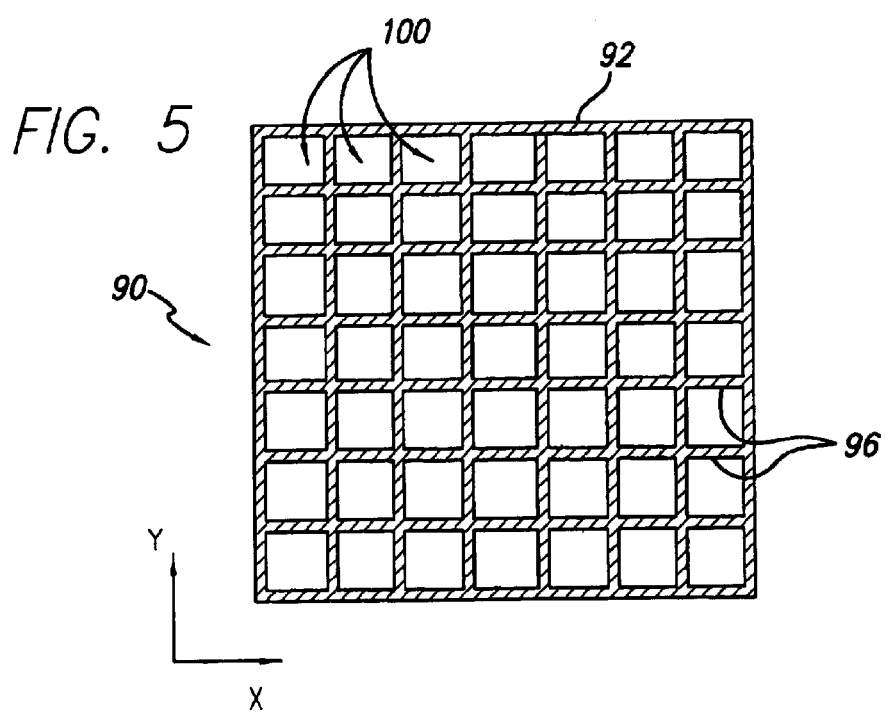
FIG. 5 is a cross-sectional view of the three-dimensional object shown in FIG. 4.

Referring to FIGS. 4 and 5, a three-dimensional object identified generally by numeral 90 is shown that is formed according to the present invention. The object 90 comprises a shell structure 92 of a desired dimensional configuration, which is shown partially removed so as to expose the internal lattice structure, generally identified by numeral 94. The internal lattice structure 94 interconnects with the shell structure 92 in all three dimensions, as referenced by the Cartesian coordinate shown, so as to maintain the desired dimensional configuration of the shell structure as it is formed. The object is formed in a layerwise manner in the X-Y plane which rises in a build direction referenced by the Z-axis of the coordinate system shown. When forming each layer, the build material is dispensed along a plurality of continuous segments that attach across the shell structure of the layer being formed. The continuous segments maintain the desired dimensional configuration of the shell structure from non-uniformly deforming as the build material solidifies and shrinks. As these continuous segments are dispensed, one over another in each successive layer, they form a plurality of vertically extending supports, as identified by numeral 96.

Referring to FIG. 5, it can be seen that the vertically extending supports 96 are flat planar elements; however, they may be curved planar elements, if desired. Generally, it is simpler to dispense the continuous segments along straight lines to form the vertically extending supports which thereby establish flat planar elements. Referring back to FIG. 4, the vertically extending supports extend between upward facing surfaces of the shell structure, as identified by numeral 98, and downward facing surfaces of the shell structure (the bottom of the cube structure that is not visible in FIG. 4). In this configuration, the plurality of vertically extending supports 96 establish a plurality of elongated compartments or void spaces, identified generally by numeral 100, as seen more clearly in FIG. 5. In order to provide support for the upward facing surface of the shell structure 98 over these elongated compartments, it is necessary to dispense a plurality of thin fiber-like post supports that are separated from one another by a gap, as disclosed in U.S. Pat. Nos. 6,193,923 and 6,270,335 to Leyden et al., which are both incorporated by reference as set forth in full. Because these fiber-like columns are separated from one another, they do not cause distortion to the object and simply remain inside the elongated compartments once the object is completed. Forming these fiber-like post supports is currently a build style implemented on the ThermoJet® solid object printers, in which the solid object is dispensed on top of a bed of these post supports shown in FIG. 4 by numeral 104. These post supports 104 are initially dispensed on the build platform to provide a region in which the object can be removed from the platform. For ease of illustration of the internal lattice structure of the present invention, these fiber-like columns formed within the elongated compartments 100 of the internal lattice structure are not shown in the figures, although they will remain within the object. In contrast, the bed of post supports 104 must be physically removed after the object is formed.

Figure 6:
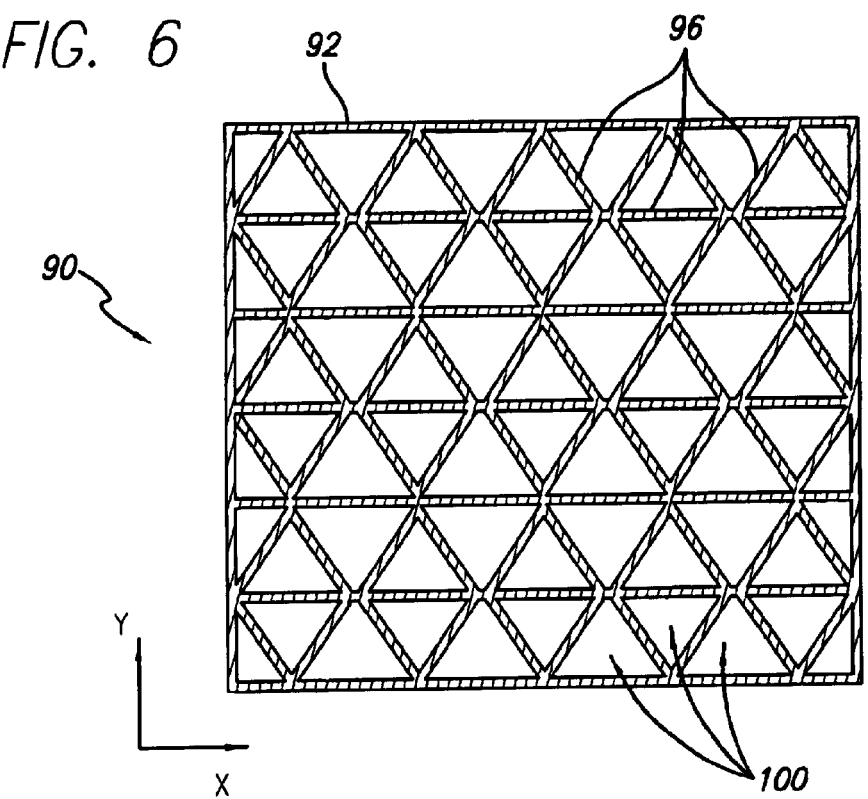
FIG. 6 is a cross-sectional view of another three-dimensional object formed according to the present invention having an alternative internal lattice structure configuration.
Figure 7:
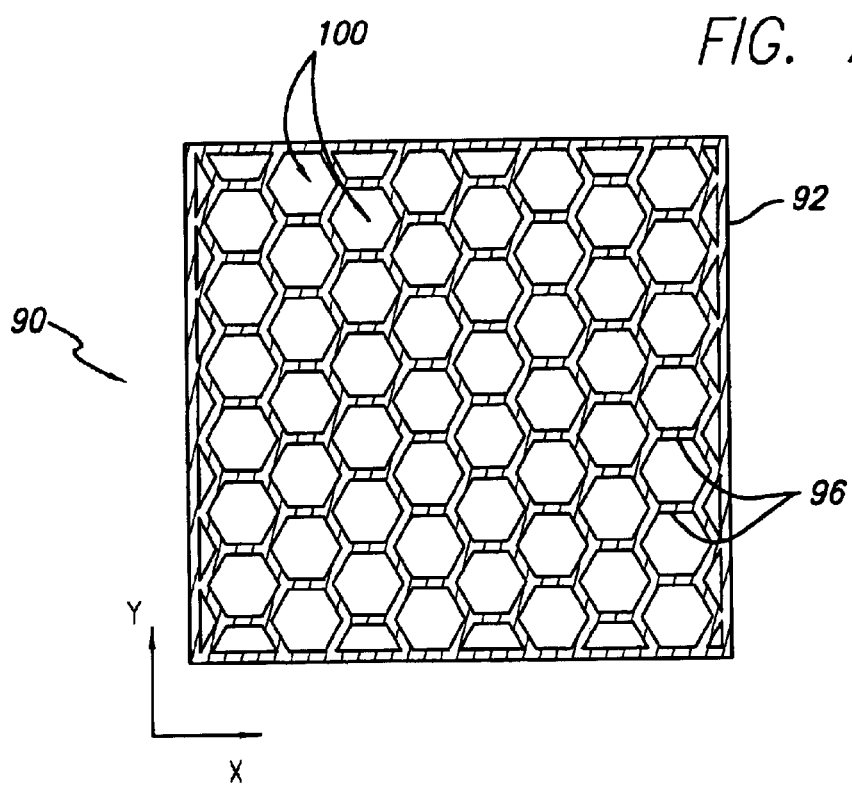
FIG. 7 is a cross-sectional view of another three-dimensional object formed according to the present invention having another alternative internal lattice structure configuration.
Figure 8:
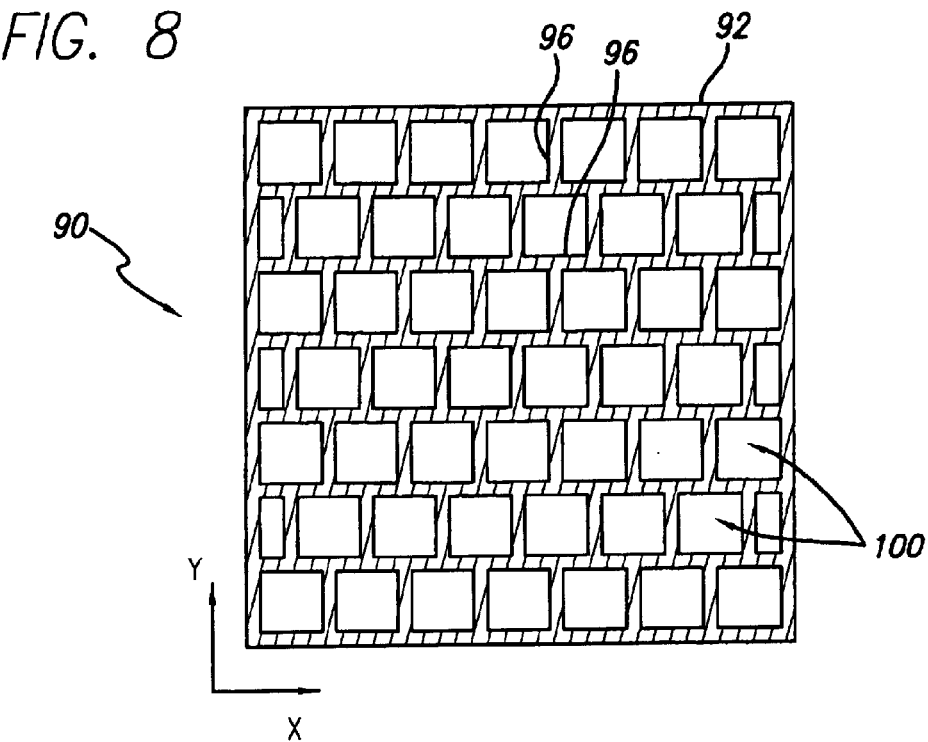
FIG. 8 is a cross-sectional view of another three-dimensional object formed according to the present invention having yet another alternative internal lattice structure configuration; and, FIG. 9 is an isometric view of a three-dimensional object formed according to the present invention from a curable phase change material and phase change support material that is shown partially cut to reveal the internal lattice structure.

Referring to FIG. 6, an alternative lattice structure of the present invention is shown for the three-dimensional object 90. In this embodiment, the vertically extending supports 96 are configured so that the elongated compartments 100 form a triangular cross-sectional shape, in contrast to the square cross-section shape of the embodiment shown in FIGS. 4 and 5. However, any polygonal configuration may be used such as a hexagon, octagon, decagon, and the like. For example, in the embodiment shown in FIG. 7, the elongated compartments 100 form a hexagonal cross-sectional shape. All that is required is that the plurality of vertically extending supports 96 of the internal lattice structure interconnect the shell structure in all three dimensions, e.g. the X-, Y-, and Z-directions, to maintain the desired dimensional configuration of the object as the build material solidifies and shrinks. Further, as shown in the embodiment of FIG. 8 and the embodiment of FIG. 7, the plurality of continuous segments dispensed in each layer can be staggered, and need not form a straight line from one end of the shell structure to another end of the shell structure, as shown in the embodiments in FIGS. 4, 5, and 6. In addition, the spacing of the continuous segments need not be uniform, but may be randomly spaced within the object, if desired.

Figure 9:
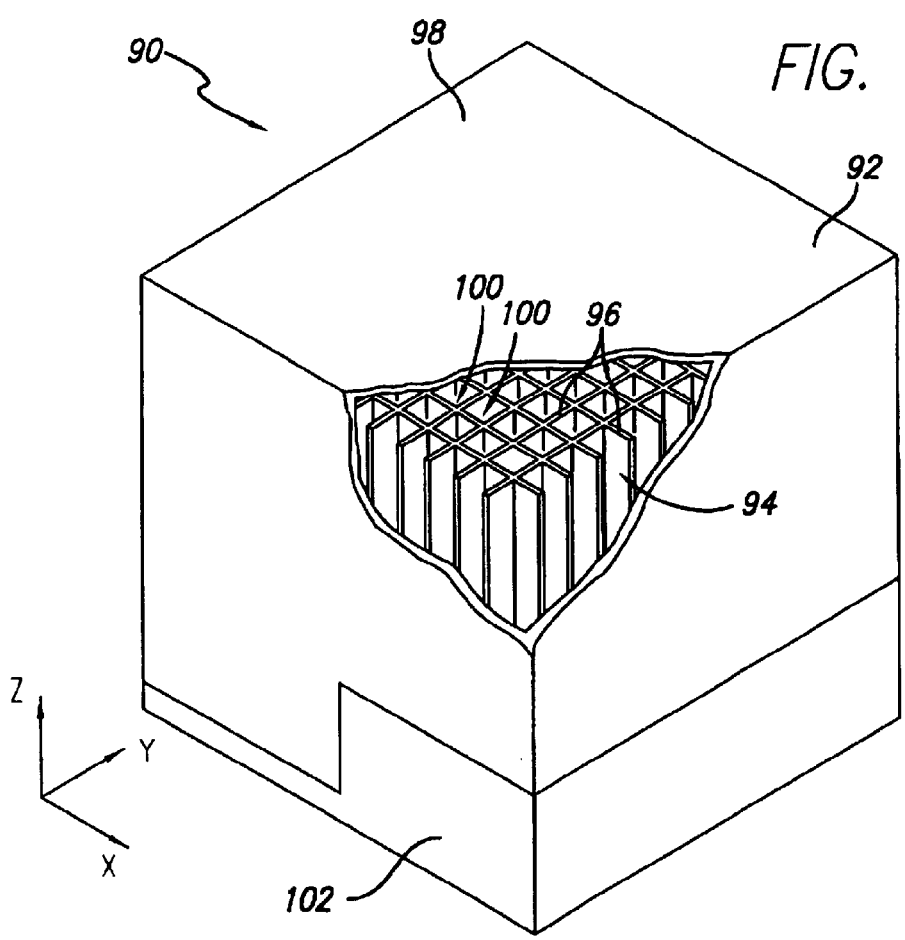

Another embodiment of the present invention is a method of forming a three-dimensional object in a layerwise manner by dispensing a curable phase change build material and a phase change support material. The curable phase change build material is curable upon exposure to radiation and is dispensed to form a shell structure of a desired dimensional configuration and to form the internal lattice structure of the object. The configuration of the internal lattice structure can be identical to any of the configurations shown of the internal lattice structure of the first embodiment; however, in this embodiment the method further requires the step of exposing the layers of build material to actinic radiation after the material in each layer has solidified. Referring to FIG. 9, a three-dimensional object 90 is shown formed according to this embodiment. The shell structure 92 and vertically extending supports 96 of the internal lattice structure 94 are formed by dispensing the curable phase change build material. The phase change support material is dispensed to form the support 102 for the downward facing surfaces of the shell structure 92. In addition, the phase change support material is dispensed to fill the elongated compartments 100 so as to provide support for the upward facing surfaces of the shell structure 98 formed over the compartments.

The quality of the downward facing surfaces of the object formed according to the embodiment shown in FIG. 9 are superior to those of the object formed according to the embodiment shown in FIG. 4. This is because there are no fiber-like post supports 104 that must be physically separated from the downward facing surfaces of the object. Instead, the phase change support material 102 can be removed by the application of heat. However, because the object shown in FIG. 9 is formed from a cured material, when used in the investment casting process as the sacrificial pattern, it must be burned out of the ceramic slurry. Thus, the object formed according to the embodiment shown in FIG. 4 has the advantage of being removed in the investment casting process at a much lower temperature and is less likely to crack the ceramic shell structure used in the casting process.

The phase change support material dispensed within the elongated compartments of the embodiment shown in FIG. 9 may be left in the object, or may be removed from the object, if desired. In order to remove the material, it is desirable that all the elongated compartments be in communication with a drainage opening provided in the shell structure. If removal of the support material is desired, the communication between the elongated compartments and drainage opening should be provided adjacent to the upper facing surface 98 of the shell structure 92 or lower facing surface of the shell structure so as to facilitate support material removal. However, removal of the support material from the elongated compartments may not be necessary even if the object is used as a sacrificial pattern in an investment casting process.

Figure 2:
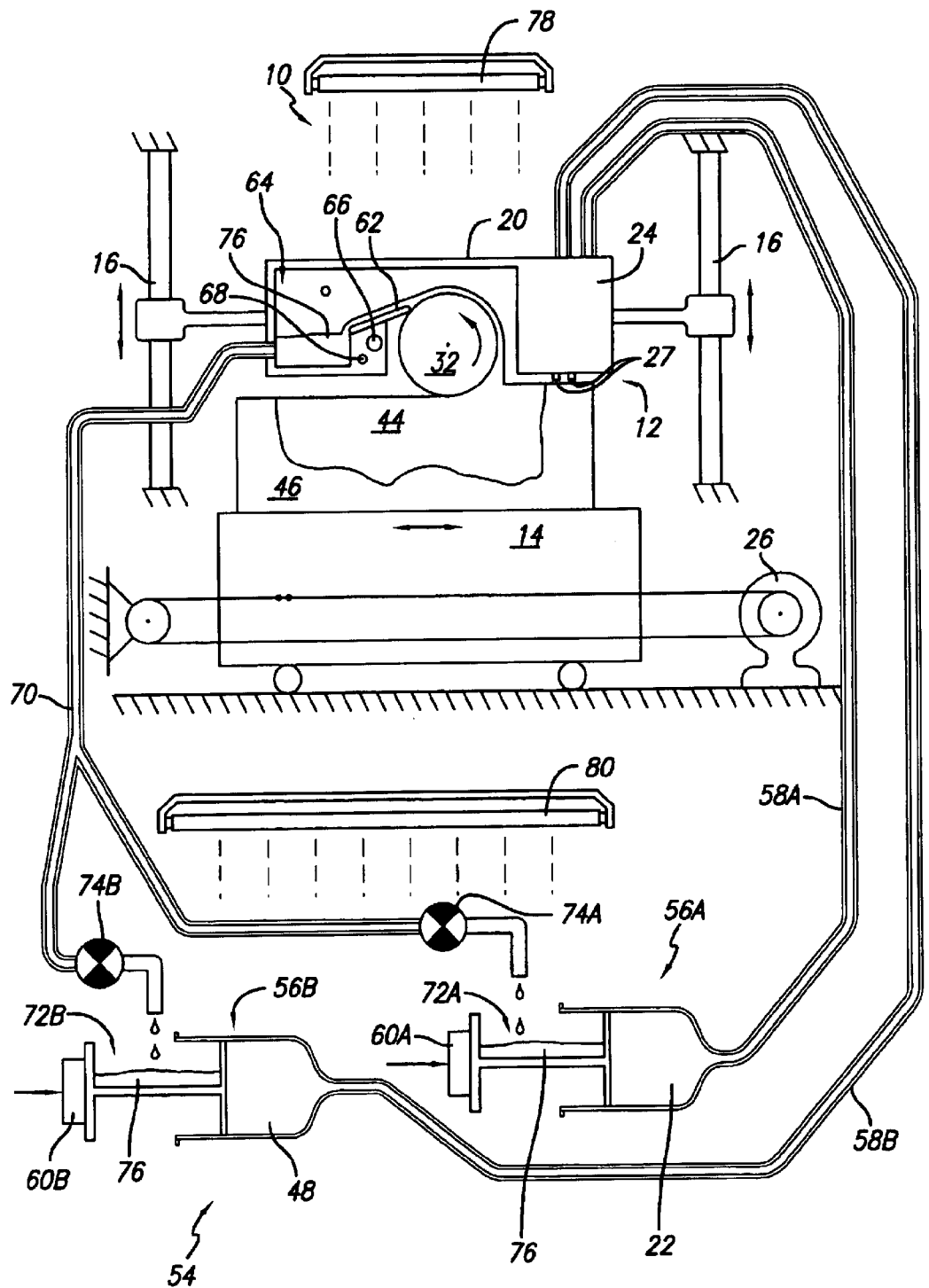
FIG. 2 is a diagrammatic side view of another apparatus for practicing the present invention.

Referring to FIG. 2, an SDM apparatus is shown generally by numeral 10 for forming the object 90 shown in FIG. 9. This apparatus dispenses a curable phase change build material and a phase change support material. The SDM apparatus 10 is shown building a three-dimensional object 44 on a support structure 46 in a build environment shown generally by the numeral 12. The object 44 and support structure 46 are built in a layer by layer manner on a build platform 14 that can be precisely positioned vertically by any conventional actuation means 16. Directly above and parallel to the platform 14 is a rail system 18 on which a material dispensing trolley 20 resides carrying a dispensing device 24. Preferably, the dispensing device 24 is an ink jet print head that dispenses a build material and support material and is of the piezoelectric type having a plurality of dispensing orifices. However, other ink jet print head types could be used, such as an acoustic or electrostatic type, if desired. A preferred ink jet print head is the Z850 print head available from Xerox Corporation of Wilsonville, Oreg. Alternatively, a bubble jet print head could be used instead of an ink jet print head, if desired.

The trolley carrying the print head 24 is fed the curable phase change build material 22 from a remote reservoir 49. The remote reservoir is provided with heaters 25 to bring and maintain the curable phase change build material in a flowable state. Likewise, the trolley carrying the print head 24 is also fed the non-curable phase change support material from remote reservoir 50 in the flowable state. In order to dispense the materials, a heating means is provided to initially heat the materials to the flowable state, and to maintain the materials in the flowable state along its path to the print head. The heating means comprises heaters 25 on both reservoirs 49 and 50, and additional heaters (not shown) on the umbilicals 52 connecting the reservoirs to the print head 24. Located on the print head 24 is a plurality of discharge orifices 27 for dispensing both the build material and support material, although just one is shown in FIG. 1. Each discharge orifice is dedicated to dispense either the build material or the support material in a manner that either material can be dispensed to any desired target location in the build environment.

A reciprocating means is provided for the dispensing device 24 which is reciprocally driven on the rail system 18 along a horizontal path by a conventional drive means 26 such as an electric motor. Generally, the trolley carrying the dispensing device 21 takes multiple passes to dispense one complete layer of the materials from the discharge orifices 27. In FIG. 1, a portion of a layer 28 of dispensed build material is shown as the trolley has just started its pass from left to right. A dispensed droplet 30 is shown in mid-flight, and the distance between the discharge orifice and the layer 28 of build material is greatly exaggerated for ease of illustration. The layer 28 may be all build material, all support material, or a combination of build and support material, as needed, in order to form and support the three-dimensional object.

The build material and support material are dispensed as discrete droplets 30 in the flowable state, which solidify upon contact with the layer 28 as a result of a phase change. Alternatively, the materials may be dispensed in a continuous stream in an SDM system, if desired. The preferred formulations of the curable build material and phase change support material are disclosed in the U.S. patent application Ser. No. 09/971,247 "Ultra-Violet Light Curable Hot Melt Composition," which is herein incorporated by reference as set forth in full. Alternative formulations for the curable build material may include thermal initiators that decompose in response to heat, such as peroxide based initiators. Such initiators induce curing by exposure to infrared (IR) radiation. WAZO materials available from E.l. du Pont de Nemours & Company are examples of one type of suitable thermal initiators. Other thermal initiators are Azo-bis-isobutyronitrile thermal initiators available commercially from Electron Microscopy Sciences of Fort Washington, Pa, and Azo initiators VA-044, VA-057, VA-085, VA-070, and VA-096 are available from Wako Chemicals USA, Inc. of Richmond, Va. Still further, the curable build material may be a powder that is cured by selectively dispensing a liquid binder from a print head in each of the layers.

Each layer of the object is divided into a plurality of pixels on a bit map, in which case a target location is assigned to the pixel locations of the object for depositing the curable phase change material 22. Likewise, pixel coordinates located outside of the object may be targeted for deposition of the non-curable phase change material 48 to form the supports for the object as needed. Generally, once the discrete droplets are deposited on all the targeted pixel locations of the bit map to establish an initial layer thickness, a solid fill condition is achieved. Preferably, the initial layer thickness established during dispensing is greater than the final layer thickness, such that the solid fill condition for each layer contains material in excess of that needed for the layer.

A planarizer 32 is drawn across the layer to smooth the layer and to normalize the layer to establish the final layer thickness. The planarizer 32 is used to normalize the layers as needed in order to eliminate the accumulated effects of drop volume variation, thermal distortion, and the like, which occur during the build process. It is the function of the planarizer to melt, transfer, and remove portions of the dispensed layer of build material in order to smooth it out and set a desired thickness for the last formed layer prior to curing the material. This ensures a uniform surface topography and layer thickness for all the layers that form the three-dimensional object; however, it produces waste material that must be removed from the system. The planarizer 32 may be mounted to the material dispensing trolley 20, if desired, or mounted separately on the rail system 18, as shown.

The planarizer 32 is utilized in SDM building techniques that deposit build material in excess of a desired thickness for each layer according to data of a prescribed pattern for each layer, and then the planarizer removes the excess build material from each layer to achieve the desired thickness. The use of the planarizer according to the present invention is preferred generally because it does not require an active feedback system that monitors the surface condition of a given layer. Importantly, however, planarizing must be completed for a given layer prior to curing the layer.

A waste collection system (not shown in FIG. 1 but shown in FIG. 2) is used to collect the excess material generated during planarizing. The waste collection system may comprise an umbilical that delivers the material to a waste tank or waste cartridge, if desired. A preferred waste system for curable phase change materials is disclosed in U.S. patent application Ser. No. 09/970,956 entitled "Quantized Feed System for Solid Freeform Fabrication," which is herein incorporated by reference as set forth in full.

In the apparatus 10 shown in FIG. 1, a single print head dispenses both the curable phase change material and the non-curable phase change material. Alternatively, multiple print heads could be used, each being dedicated to dispensing either or both of the materials. Preferably the non-curable material is selected so as to be easily removed from the three-dimensional object at the end of the layerwise build process, yet have a similar melting point and freezing point as the curable material so that dispensing and planarizing will be uniform. In this embodiment, separate material delivery systems are required for the two different materials; however, only one waste collection system is needed since the waste is a combination of both materials collected after planarizing.

The SDM apparatus 10 includes an actinic radiation source generally shown by numeral 36 that is mounted on rail system 18. The radiation source 36 is reciprocally driven along rail system 18 to position the radiation source over a just formed layer of material. The radiation source 36 includes an ultraviolet radiation emitting bulb 38 which is used to provide flood exposure of UV radiation to each layer after the planarizer has normalized the layer. Alternatively, multiple layers can be dispensed and normalized prior to curing by flood exposure to UV radiation. The exposure is executed in a flash manner, preferably by turning on and off the bulb 38 at a desired time, such as after the planarizer has been retracted from the build area and while the radiation source is traversed along the rail system over the build area. Alternatively, the bulb could remain on and a shutter system could be used to control the flash operation of exposure, if desired. Although the actinic radiation source 36 is shown reciprocally mounted on rail system 18, it may be mounted directly on the dispensing trolley, if desired. It is important to shield the print head and planarizer from exposure to the actinic radiation so as to prevent curing material in the dispensing orifices or on the surface of the planarizer, either of which would ruin the build process and damage the apparatus.

An external computer 34 generates or is provided with a solid modeling CAD data file containing three-dimensional coordinate data of an object to be formed. Typically the computer 34 converts the data of the object into surface representation data, most commonly into the STL file format. In the preferred embodiment, the computer also establishes data corresponding to support regions for the object. When a user desires to build an object, a print command is executed at the external computer in which the STL file is processed, through print client software, and sent to the computer controller 40 of the SDM apparatus 10 as a print job. The processed data transmitted to the computer controller 40 can be sent by any conventional data transferable medium desired, such as by magnetic disk, magnetic tape, microelectronic memory, network connection, or the like. The computer controller processes the data and executes the signals that operate the apparatus to form the object. When practicing the present invention with this apparatus, it is the computer controller which processes the computer data to establish the layer data which includes the data representing the internal lattice structure. Alternatively, however, the external computer 34 could do this processing, if desired. The data transmission route and controls of the various components of the SDM apparatus are represented as dashed lines at 42.

When an object is to be formed according to the present invention, it may be intended for use in the investment casting process. To account for this use, it is advantageous to provide shrink compensation factors prior to forming the object. Shrink compensation factors for the X, Y, and Z dimensions compensate for linear shrinkage of the sacrificial three-dimensional object built by the SDM process, and for linear shrinkage that occurs when forming the final object in the investment casting process. Preferably, an operator enters the shrink compensation factors on the external computer 34, which correspondingly enlarge the computer data with respect to the desired dimensional configuration of the object prior to processing the data to establish the layer data.

After the material for each layer is dispensed and solidified, a planarizer 32 is then used to normalize each layer. After normalization, each layer is then provided with a flood exposure to UV radiation by radiation source 38 which is part of an exposure trolley 38. The flood exposure cures the build material and not the support material.

After an object is formed, the support material is removed by further processing. Generally, application of thermal heat to bring the support material back to a flowable state is needed to remove substantially all of the support material from the three-dimensional object. This can be accomplished in a variety of ways. For example, the part can be placed in a heated vat of liquid material such as water or oil. Physical agitation may also be used, such as by directing a jet of the heated liquid material directly at the support material. This can be accomplished by steam cleaning with appropriate equipment. Alternatively, the support material can also be removed by submersing the material in an appropriate liquid solvent to dissolve the support material. When practicing the present invention, only the material supporting the downward facing surfaces of the object need be removed, although the support material within the elongated compartments may be removed, if desired.

Referring particularly to FIG. 2, there is illustrated generally by the numeral 10 another embodiment of an apparatus for forming the object 90 shown in FIG. 9. This apparatus also dispenses a curable phase change build material and phase change support material. This apparatus 10 is shown including schematically a material feed and waste system illustrated generally by numeral 54. In contrast to the SDM apparatus shown in FIG. 1, the build platform 14 is reciprocally driven by the conventional drive means 26 instead of the dispensing trolley 20. The dispensing trolley 20 is precisely moved by actuation means 16 vertically to control the thickness of the layers of the object. Preferably, the actuation means 16 comprises precision lead screw linear actuators driven by servomotors. The ends of the linear actuators 16 reside on opposite ends of the build environment 12 and in a transverse direction to the direction of reciprocation of the build platform. However, for ease of illustration, in FIG. 2 they are shown in a two-dimensionally flat manner giving the appearance that the linear actuators are aligned in the direction of reciprocation of the build platform 14. Although they may be aligned with the direction of reciprocation, it is preferred they be situated in transverse direction so as to optimize the use of space within the apparatus.

In the build environment generally illustrated by numeral 12, there is shown by numeral 44 a three-dimensional object being formed with integrally formed supports 46. The object 44 and supports 46 both reside in a sufficiently fixed manner on the build platform 14 so as to sustain the acceleration and deceleration effects during reciprocation of the build platform while still being removable from the platform. In order to achieve this, it is desirable to dispense at least one complete layer of support material on the build platform before dispensing the build material since the support material is designed to be removed at the end of the build process. The curable phase change build material identified by numeral 22 is dispensed by the apparatus 10 to form the three-dimensional object 44, and the non-curable phase change material identified by numeral 48 is dispensed to form the support 46. Containers identified generally by numerals 56A and 56B respectively hold a discrete amount of these two materials 22 and 48. Umbilicals 58A and 58B, respectively, deliver the material to the print head 24. The materials 22 and 48 are heated to a flowable state, and heaters (not shown) are provided on the umbilicals 58A and 58B to maintain the materials in the flowable state as they are delivered to the print head 24. In this embodiment, the ink jet print head is configured to dispense both materials from a plurality of dispensing orifices so that both materials can be selectively dispensed in a layerwise fashion to any target location in any layer being formed. When the print head 24 needs additional material 22 or 48, extrusion bars 60A and 60B are respectively engaged to extrude the material from the containers 56A and 56B, through the umbilicals 58A and 58B, and to the print head 24.

The dispensing trolley 20 shown in FIG. 2 comprises a heated planarizer 32 that removes excess material from the layers to normalize the layers being dispensed. The heated planarizer contacts the material in a non-flowable state, and because it is heated, locally transforms some of the material to a flowable state. Due to the forces of surface tension, this excess flowable material adheres to the surface of the planarizer, and as the planarizer rotates, the material is brought up to the skive 62 which is in contact with the planarizer 32. The skive 62 separates the material from the surface of the planarizer 32 and directs the flowable material into a waste reservoir, identified generally by numeral 64 located on the trolley 20. A heater 66 and thermistor 68 on the waste reservoir 64 operate to maintain the temperature of the waste reservoir at a sufficient point so that the waste material in the reservoir remains in the flowable state. The waste reservoir is connected to a heated waste umbilical 70 for delivery of the waste material to the waste receptacles 72A and 72B. The waste material is allowed to flow via gravity down to the waste receptacles 72A and 72B. Although only one umbilical 70 with a splice connection to each waste receptacle is shown, it is preferred to provide a separate waste umbilical 70 between the waste reservoir 64 and each waste receptacle 72A and 72B. For each waste receptacle 72A and 72B, there is associated a solenoid valve 74A and 74B for regulating the delivery of waste material to the waste receptacles. Preferably, the valves 74A and 74B remain closed, and only open when the respective extrusion bars 60A and 60B are energized to remove additional material. For example, if only extrusion bar 60A is energized, only valve 74A will open to allow waste material 76 to be dispensed into the waste receptacle 72A. This feedback control of the valves prevents delivery of too much waste material to either waste receptacle, by equalizing the delivery of waste material in the waste receptacles in proportion to the rate at which material is fed from the containers to the dispensing device. Thus, the delivery of waste material to the waste receptacles is balanced with the feed rates of build material and support material of the feed system.

After the curable phase change build material 22 and non-curable phase change support material 48 are dispensed in a layer, they transition from the flowable state to a non-flowable state. After a layer has been normnalized by the passage of the planarizer 32 over the layer, the layer is then exposed to actinic radiation by radiation source 78. Preferably, the actinic radiation is in the ultraviolet or infrared band of the spectrum. It is important, however, that planarizing occurs prior to exposing a layer to the radiation source 78. This is because the preferred planarizer can only normalize the layers if the material in the layers can be changed from the non-flowable to the flowable state, which cannot occur if the material 22 is first cured.

Both materials accumulate and are removed by the planarizer 32 to form the waste material. Preferably, a second radiation source 80 is provided to expose the waste material in the waste receptacles to radiation to cause the build material 22 in the receptacles to cure so that there is no reactive material in the waste receptacles.

Figure 3:
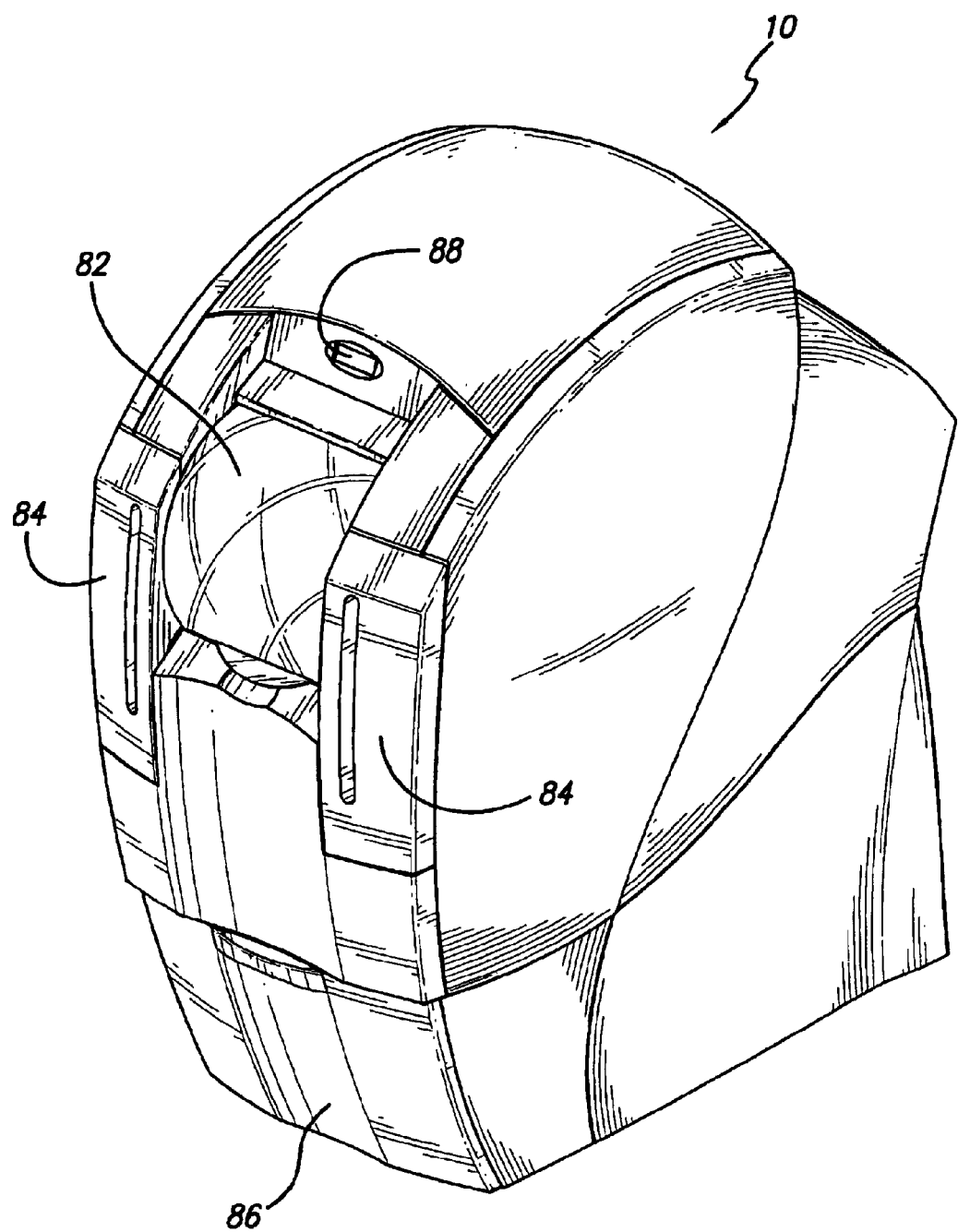
FIG. 3 is an isometric view of the apparatus of FIG. 2 for practicing the present invention.

The SDM apparatus 10 schematically shown in FIG. 2 is shown in FIG. 3. To access the build environment of the apparatus, a slideable door 82 is provided at the front of the apparatus. The door 82 does not allow radiation within the machine to escape into the environment. The apparatus is configured such that it will not operate or turn on with the door 82 open. In addition, when the apparatus is in operation, the door 82 will not open. Material feed doors 84 are provided so that the curable phase change material can be inserted into the apparatus through one door 84 and the non-curable phase change material can be inserted into the apparatus through the other. A waste drawer 86 is provided at the bottom end of the apparatus 10 so that the expelled waste material can be removed from the apparatus. A user interface 88 is provided which is in communication with the external computer previously discussed which tracks receipt of the print command data from the external computer.

What has been described are preferred embodiments in which modifications and changes may be made without departing from the spirit and scope of the accompanying claims.

What is claimed is:

1. A method of forming a three-dimensional object by selective deposition modeling from a solidifiable build material, the three-dimensional object having an outer surface defined by a shell structure of a desired dimensional configuration surrounding an internal volume of the object, the method comprising the steps of:

selectively dispensing the build material from at least one orifice in a flowable state to form layers of the object comprising the shell structure and an internal lattice structure formed in the areas of the layers that reside within the internal volume of the object, the internal lattice structure formed by dispensing the build material along a plurality of continuous segments that attach across the shell structure of the layer being formed for maintaining the desired dimensional configuration of the shell structure as it is formed; and solidifying the dispensed material to a non-flowable state, the internal lattice structure substantially preventing the shell structure from non-uniformly deforming as the build material solidifies and shrinks.

2. The method of claim 1 wherein the internal lattice structure interconnects the shell structure in a X-direction, in a Y-direction, and in a Z-direction to maintain the desired dimensional configuration in all three-dimensions as the build material solidifies and shrinks.

3. The method of claim 1 wherein the plurality of continuous segments of the internal lattice structure forms a plurality of vertically extending supports.

4. The method of claim 3 wherein at least one of the vertically extending supports is a flat planar element.

5. The method of claim 3 wherein at least one of the vertically extending supports is a curved planar element.

6. The method of claim 3 wherein the vertically extending supports extend between upward facing surfaces and downward facing surfaces of the shell structure of the three-dimensional object and thereby establish a plurality of elongated compartments within the three-dimensional object.

7. The method of claim 6 further comprising the step of:
dispensing the build material to form post supports residing within said elongated compartments to provide support for upward facing surfaces of the shell structure of the three-dimensional object formed over said elongated compartments.

8. The method of claim 6 wherein the horizontal cross-sectional shape of said elongated compartments is polygonal.

9. The method of claim 1 further comprising the steps of:
providing computer data representing the three-dimensional object, the computer data comprising data representing the shell structure; and
processing the computer data to establish layer data for forming the layers of the object comprising the shell structure and internal lattice structure.

10. The method of claim 1 further comprising the step of:
providing the ability to enlarge the computer data with respect to the desired dimensional configuration of the three-dimensional object to account for linear shrinkage of the three-dimensional object as it is formed, the ability to enlarge the computer data provided the step of processing the computer data to establish layer data.

11. The method of claim 1 wherein the build material is a phase change material solidified by lowering the temperature of the build material after it has been dispensed.

12. The method of claim 1 wherein the build material is a powder and is solidified by selectively dispensing a binder that reacts with the powder to cure the powder to form the shell structure and the internal lattice structure.

13. A method of forming a three-dimensional object by selective deposition modeling from a build material curable upon exposure to actinic radiation, the three-dimensional object having an outer surface defined by a shell structure of a desired dimensional configuration, the method comprising the steps of:
selectively dispensing the curable build material from at least one orifice in a flowable state to form layers of the object comprising the shell structure and an internal lattice structure in the areas of the layers that reside within the internal volume of the object, the internal lattice structure formed by dispensing the build material along a plurality of continuous segments that attach across the shell structure of the layer being formed for maintaining the desired dimensional configuration of the shell structure as it is formed;
solidifying the dispensed material to a non-flowable state, the internal lattice structure substantially preventing the shell structure from non-uniformly deforming as the build material solidifies and shrinks; and
curing the dispensed layers of build material after the dispensed build material has solidified.

14. The method of claim 13 wherein the internal lattice structure interconnects the shell structure in a X-direction, in a Y-direction, and in a Z-direction to maintain the desired dimensional configuration in all three dimensions as the build material solidifies and shrinks.

15. The method of claim 13 further comprising the steps of:
providing computer data representing the three-dimensional object, the computer data comprising data representing the shell structure; and
processing the computer data to establish layer data for forming the layers of the object comprising the shell structure and internal lattice structure.

16. The method of claim 15 further comprising the step of:
providing the ability to enlarge the computer data with respect to the desired dimensional configuration of the three-dimensional object to account for linear shrinkage of the three-dimensional object as it is formed, the ability to enlarge the computer data provided before the step of processing the computer data to establish layer data.

17. The method of claim 13 further comprising the steps of:
dispensing a support material in a flowable state to support the shell structure of the three-dimensional object;
solidifying the dispensed support material to a non-flowable state; and
removing at least some of the support material from the three-dimensional object after the three-dimensional object has been formed.

18. The method of claim 17 wherein the plurality of continuous segments of the internal lattice structure form a plurality of vertically extending supports.

19. The method of claim 18 wherein at least one of the vertically extending supports is a flat planar element.

20. The method of claim 18 wherein at least one of the vertically extending supports is a curved planar element.

21. The method of claim 18 wherein the vertically extending supports extend between upward facing surfaces and downward facing surfaces of the shell structure of the three-dimensional object and thereby establish a plurality of elongated compartments within the three-dimensional object.

22. The method of claim 21 wherein the support material is dispensed into each elongated compartment to provide support for upward facing surfaces of the shell structure of the three-dimensional object formed over said elongated compartments.

23. The method of claim 21 wherein the horizontal cross-sectional shape of said elongated compartments is polygonal.

24. The method of claim 21 wherein the elongated compartments are interconnected and the method further comprising the steps of:
providing a drainage opening in the shell structure; and
removing the support material from the elongated compartments after three-dimensional object has been formed.

25. The method of claim 1 further comprising dispensing the build material from an print head or a nozzle.

26. The method of claim 13 further comprising dispensing the build material from an print head or a nozzle.

27. A method of forming a three-dimensional object by selective deposition modeling from a solidifiable build material, the three dimensional object having an outer surface defined by a shell structure of a desired dimensional configuration, the method comprising the steps of:
selectively dispensing the build material in a flowable stale to form layers of the object comprising the shell structure and an internal lattice structure in the areas of the layers that reside within the internal volume of the object, the internal lattice structure formed by dispensing the build material along a plurality of continuous segments that attach across the shell structure of the layer being formed for maintaining the desired dimensional configuration of the shell structure as it is formed and forming a plurality of vertically extending supports at least one which is a curved planar element; and solidifying the dispensed material to a non-flowable state, the internal lattice structure substantially preventing the shell structure from non-uniformly deforming as the build material solidifies and shrinks.

28. The method of claim 27 wherein the build material is curable upon exposure to actinic radiation.

* * * * *